United States Patent
Shigemoto et al.

(10) Patent No.: US 6,585,831 B2
(45) Date of Patent: Jul. 1, 2003

(54) METHOD OF MAKING IRON BASE MAGNETIC MATERIAL ALLOY POWDER

(75) Inventors: Yasutaka Shigemoto, Ibaraki (JP); Satoshi Hirosawa, Otsu (JP)

(73) Assignee: Sumitomo Special Metals Co., Ltd. (JP)

( * ) Notice: Subject to any disclaimer, the term of this patent is extended or adjusted under 35 U.S.C. 154(b) by 0 days.

(21) Appl. No.: 09/741,080

(22) Filed: Dec. 21, 2000

(65) Prior Publication Data
US 2001/0020494 A1 Sep. 13, 2001

(30) Foreign Application Priority Data
Dec. 27, 1999 (JP) .............................. 11-369806

(51) Int. Cl.$^7$ .............................................. H01F 1/057
(52) U.S. Cl. ......................................... 148/101; 75/354
(58) Field of Search ................................ 148/101, 102, 148/104; 75/354

(56) References Cited

U.S. PATENT DOCUMENTS

| | | | | |
|---|---|---|---|---|
| 4,496,395 A | * | 1/1985 | Croat | 148/301 |
| 4,881,986 A | * | 11/1989 | Sato et al. | 148/103 |
| 5,545,266 A | * | 8/1996 | Hirosawa et al. | 148/302 |
| 5,634,987 A | * | 6/1997 | Zhang et al. | 148/302 |
| 5,845,856 A | | 12/1998 | Tanaka et al. | |
| 5,957,398 A | * | 9/1999 | Ogata et al. | 241/27 |

FOREIGN PATENT DOCUMENTS

| | | | |
|---|---|---|---|
| EP | 0 657 899 A1 | * | 6/1995 |
| EP | 0 959 478 | | 11/1999 |
| EP | 1 018 751 | | 7/2000 |
| JP | 61-129046 | | 6/1986 |
| JP | 61-234955 | | 10/1986 |
| JP | 03-014203 | | 1/1991 |
| JP | 03-046202 | | 2/1991 |
| JP | 06-096919 | | 4/1994 |
| JP | 08-335508 | | 12/1996 |
| JP | 10-321427 | | 4/1998 |
| JP | 10-265915 | | 10/1998 |
| JP | 11-277188 | | 10/1999 |

OTHER PUBLICATIONS

The Condensed Chemical Dictionary, $8^{th}$ ed., 1971, p. 905*

* cited by examiner

Primary Examiner—John Sheehan
(74) Attorney, Agent, or Firm—Nixon Peabody LLP; Jeffrey L. Costellia

(57) ABSTRACT

A method of making an iron base magnetic material alloy powder includes the steps of: preparing an iron base magnetic material alloy containing at least 50% by mass of iron; and pulverizing the magnetic material alloy using a pin mill. A portion of the mill, which comes into contact with the magnetic material alloy, is made of a cemented carbide material at least partially.

8 Claims, 5 Drawing Sheets

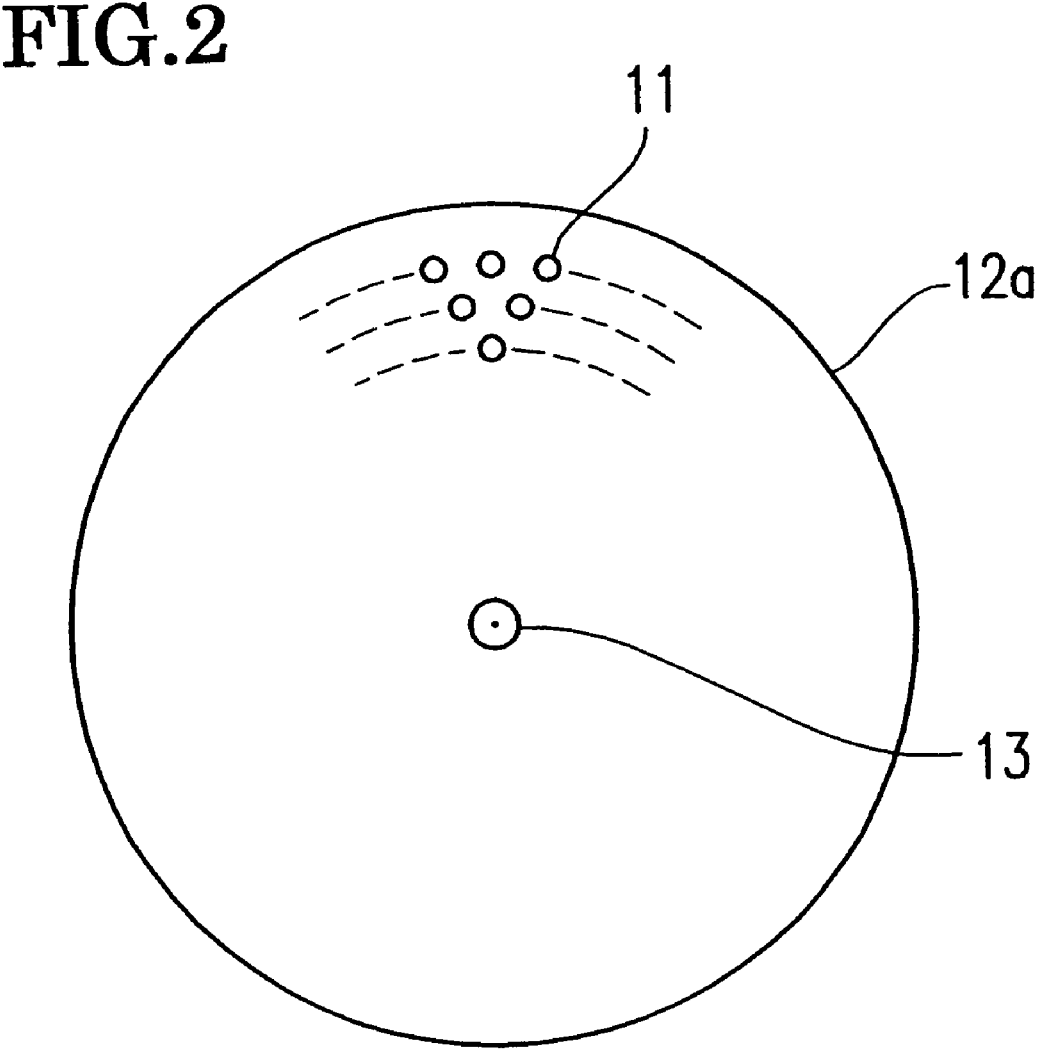

METHOD OF MAKING IRON BASE MAGNETIC MATERIAL ALLOY POWDER

FIELD OF THE INVENTION

The present invention relates to a method of making an iron base magnetic material alloy powder containing at least 50% by mass of iron and also relates to a method of making a magnetic material product out of the powder.

BACKGROUND OF THE INVENTION

The present invention is applicable to various iron base magnetic material alloys that include not only hard magnetic material alloys, but also soft magnetic material alloys and nanocomposite magnets including hard and soft magnetic phases in combination. The magnetic material products made by the method of the present invention cover a wide range including not just permanent magnets like sintered or bonded magnets, but magnetic shield materials as well.

In the known processes, various types of milling machines such as jet mills, power mills and ball mills have been used widely to pulverize magnetic material alloys. However, it is impossible to obtain a powder of a particle size as large as about 100 μm using a jet mill. Using a power mill or ball mill on the other hand, the resultant particle size distribution cannot be a single normal distribution. For these reasons, a pin disk mill has been used most often to prepare a powder of a mean particle size of 10 μm through 100 μm by pulverizing a magnetic material alloy. Various techniques of pulverizing an iron base magnetic material alloy with a pin disk mill are disclosed in Japanese Laid-Open Publication Nos. 3-14203, 3-46202 and 10-321427, for example.

A pin disk mill is a kind of impact crusher. Normally, a pin disk mill includes two disks that are disposed to face each other. On one side of each of these two disks, multiple milling pins (which will be herein referred to as "pins" simply) are arranged so as not to collide against each other. At least one of the two disks rotates at a high velocity. A workpiece to be pulverized by the pin disk mill is loaded into the space between the two disks. The workpiece collides against the pins on the rotating and/or non-moving disks and is pulverized due to the impact generated. The disks and pins of a pin disk mill are made of austenitic stainless steel (JIS SUS304), for example.

However, we found that if an iron base magnetic material alloy, containing at least 50% by mass of iron, is pulverized with a pin disk mill, the pins will be soon worn out during the pulverization process so that the particle size distribution of the resultant powder changes with time. An intermetallic compound contained in a nanocomposite magnet and a boride phase such as $Fe_{23}B_6$, in particular, have high hardness. Accordingly, these materials considerably wear the pins and blades of a milling machine, and the particle size distribution changes noticeably with time. When a milling machine like this is applied to manufacturing of magnetic material products including magnets, such a change in particle size distribution deteriorates the magnetic properties of the final products. For example, if the mean particle size increases as a result of the size distribution changing, then the percentage of magnetic powder particles successfully filled in might decrease in an injection or compaction molding process. In the current state of the art, that unwanted size distribution changing is unavoidable unless pins or other parts of the machine are replaced frequently. In that case, however, the throughput will decrease considerably. Additionally, the manufacturing costs will also rise because additional personnel costs are required for the exchange.

SUMMARY OF THE INVENTION

It is therefore an object of this invention to provide a method of making an iron base magnetic material alloy powder while avoiding both the short-term wear of pins and other parts and particle size distribution changing even when the material alloy is pulverized with a pin mill.

Another object of the present invention is to provide magnetic material products like bonded magnets by utilizing the inventive method of making an iron base magnetic material alloy powder.

An inventive method of making an iron base magnetic material alloy powder includes the steps of: a) preparing an iron base magnetic material alloy containing at least 50% by mass of iron; and b) pulverizing the magnetic material alloy using a pin mill. A portion of the mill, which comes into contact with the magnetic material alloy, is made of a cemented carbide material at least partially.

In one embodiment of the present invention, the cemented carbide material is preferably tungsten carbide.

In another embodiment, an iron base magnetic material alloy powder of a mean particle size of 10 μm through 100 μm may be obtained by pulverizing the magnetic material alloy using a pin mill.

In this particular embodiment, the step a) preferably includes: forming a melt of a material alloy; and quenching the material alloy to form a solidified alloy.

Specifically, the magnetic material alloy is preferably an Fe—R—B alloy, where Fe is iron, B is boron and R is a rare earth element. Part of boron atoms in the above alloy may be replaced with carbon atoms. R is preferably selected from the group consisting of Pr, Nd, Dy and Tb.

More specifically, the magnetic material alloy is preferably a nanocrystalline magnetic material for a nanocomposite magnet, for example. Alternatively, the magnetic material alloy may also be a soft magnetic material or a magnetostrictive material.

In still another embodiment, the pin mill preferably includes a rotating disk and multiple pins arranged on the disk, and at least part of the pins are preferably made of the cemented carbide material.

According to an inventive method of making a magnetic material product, a magnetic material product is formed out of an iron base magnetic material alloy powder that has been prepared by any of the embodiments of the inventive method of making an iron base magnetic material alloy powder.

In one embodiment of the present invention, the magnetic material product may be a permanent magnet such as a bonded magnet.

An inventive method of preparing an iron base alloy powder for a permanent magnet includes the steps of: a) cooling a melt of an Fe—B—R alloy by a quenching process to obtain a solidified alloy with a thickness of 80 μm through 300 μm; b) heat-treating and crystallizing the solidified alloy to impart permanent magnet properties to the alloy; and c) pulverizing the alloy using a pin mill to obtain a powder of a mean particle size of 10 μm through 100 μm. A portion of the pin mill, which comes into contact with the alloy, is made of a cemented carbide material at least partially.

In one embodiment of the present invention, the method may further include the step of coarsely pulverizing the solidified alloy before the step b) is performed.

In another embodiment of the present invention, before the step b) is performed, the solidified alloy may have a structure in which an amorphous phase; at least one metastable phase selected from the group consisting of $Fe_{23}B_6$, $Fe_3B$ and $R_2Fe_{23}B_3$ phases; and an $R_2Fe_{14}B$ phase co-exist. Alternatively, the solidified alloy may also have an amorphous structure before the step b) is performed.

In still another embodiment, the alloy imparted with the permanent magnet properties may be expressed by a formula $Fe_{100-x-y}R_xB_y$, where R is at least one rare earth element. R is preferably selected from the group consisting of Pr, Nd, Dy and Tb. In this formula, x is equal to or greater than 2 atomic percent and equal to or less than 6 atomic percent, and y is equal to or greater than 15 atomic percent and equal to or less than 20 atomic percent. The alloy preferably includes, as constituent phases, Fe, an Fe—B alloy, and a compound with an $R_2Fe_{14}B$ crystal structure. A mean crystal grain size of the constituent phases is preferably 100 nm or less.

An inventive method of producing a bonded magnet includes the steps of: preparing an iron base alloy powder for a permanent magnet by any of the embodiments of the method of preparing an iron base alloy powder; and molding the iron base alloy powder.

BRIEF DESCRIPTION OF THE DRAWINGS

FIG. 2 is a front view illustrating a disk, on which multiple pins are arranged, for the mill shown in FIG. 1;

DESCRIPTION OF THE PREFERRED EMBODIMENTS

According to the present invention, after an iron base magnetic material alloy containing at least 50% by mass of iron has been prepared, the material alloy is pulverized using a pin mill. Portions of the mill, which come into contact with the material alloy to be milled, are made of a cemented carbide material (preferably, a sintered body of tungsten carbide) at least partially.

We found that where portions (e.g., pins) of a pin mill, colliding against a workpiece to be milled, were made of a cemented carbide material, the pins were not worn out easily even if a highly viscous iron base magnetic material alloy, containing at least 50% by mass of iron, was pulverized using the mill. Thus, a desired particle size distribution could be maintained even after the pulverization process.

Figure 1A:
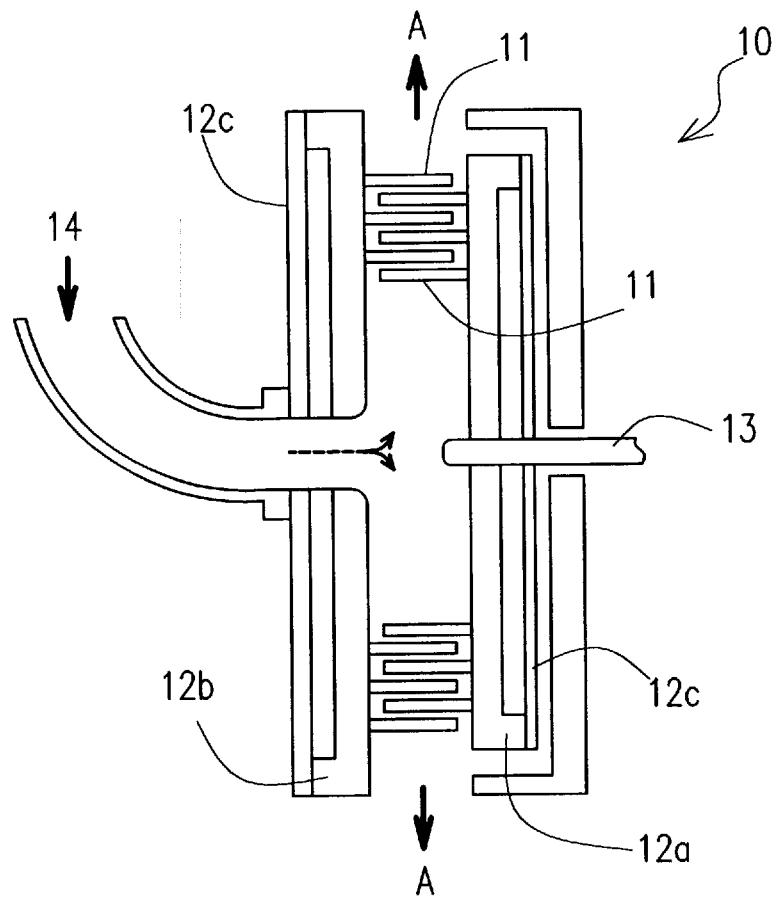
FIG. 1A is a cross-sectional view illustrating a pin disk mill for use in the present invention.
Figure 1B:
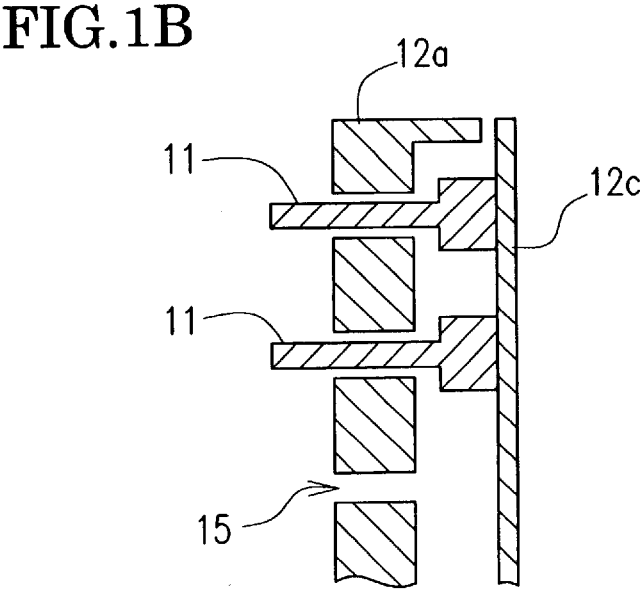
FIG. 1B is a cross-sectional view illustrating part of the mill shown in FIG. 1A.

FIG. 1A is a cross-sectional view illustrating an exemplary pin mill for use in this embodiment, while FIG. 1B is a cross-sectional view illustrating part of the mill shown in FIG. 1A on a larger scale. In the illustrated embodiment, the pin mill 10 is implemented as a pin disk mill. The mill 10 includes two disks 12a and 12b disposed to face each other. On one side of each of these disks 12a and 12b, multiple pins 11 are arranged so as not to collide against each other as one of the disks rotates relative to the other. At least one of these disks 12a and 12b rotate(s) at a high velocity. In the embodiment illustrated in FIG. 1A, the disk 12a rotates around a shaft 13. The bottom of each pin 11 is secured to the corresponding disk 12a or 12b via a plate 12c as is shown in FIG. 1B. FIG. 2 illustrates a front view of the disk 12a that is supposed to rotate. On the disk 12a shown in FIG. 2, the pins 11 are arranged to form a plurality of concentric circles. Although not shown, the pins 11 are also arranged in a similar concentric pattern on the fixed disk 12b.

A workpiece to be pulverized by the pin disk mill 10 is loaded through an inlet port 14 into the space between the two disks 12a and 12b, collides against the pins 11 on the rotating and non-moving disks 12a and 12b and is pulverized due to the impact. A powder, formed by this pulverization, is blown off in the direction indicated by the arrows A in FIG. 1A and then collected to a predetermined position finally.

In the pin mill 10 of this embodiment, the disks 12a and 12b, supporting the pins 11 thereon, are made of a stainless steel, for example, while the pins 11 are made of a cemented carbide material like a sintered tungsten carbide (WC). Examples of other preferred cemented carbide materials include TiC, MoC, NbC, TaC and $Cr_3C_2$. Each of these cemented carbide materials is a sintered body obtained by combining a carbide powder of a Group IVa, Va or VIa metal element with Fe, Co, Ni, Mo, Cu, Pb or Sn or an alloy thereof.

The pins 11 do not have to be made of the cemented carbide material entirely. Instead, just the surface of the pins 11 may be covered with the cemented carbide material. Also, other portions of the pin mill 10, which also come into contact with the workpiece (e.g., the surface portion or the entire portion of the disks), may be made of the cemented carbide material. However, only the surface portion or the entire portion of the pins 11 is preferably made of the cemented carbide material because the pins 11 are worn out most easily in the pin mill 10. As shown in FIG. 1B, the pins 11 are preferably inserted into the disk 12a (or 12b) through multiple through holes 15 from the backside. In that case, only worn-out ones of the pins 11 can be replaced with new pins selectively.

Hereinafter, preferred embodiments of the inventive method of making an iron base magnetic material alloy powder will be described in detail.

In the following illustrative embodiments, it will be described how to prepare a powder of an Fe—R—B nanocomposite magnet alloy, which is an exemplary iron base magnetic material alloy according to the present invention. A nanocomposite magnet alloy is an iron base alloy, in which nanocrystalline iron borides of soft magnetic phases (e.g., $Fe_3B$ and $Fe_{23}B_6$) and nanometer-scaled crystals of an $R_2Fe_{14}B$ phase (i.e., a hard magnetic phase) are distributed uniformly within a single micro-structure and magnetically coupled together through exchange interactions.

A nanocomposite magnet alloy like this is prepared by solidifying a melt of an alloy expressed by a formula $Fe_{100-x-y}R_xB_y$ by a quenching method such as a jet casting method or a strip casting method, and then heat-treating the solidified alloy appropriately. In $Fe_{100-x-y}R_xB_y$, R is at least one rare earth element selected from the group consisting of Pr, Nd, Dy and Tb, 2 at %≦x≦6 at % and, 15 at %≦y≦20 at %. Where a single roll method is used for the quenching process, a melt of the alloy is solidified by propelling the melt against a chill roll. According to this method, the resultant solidified alloy will be a thin strip (i.e., ribbon) extended along the periphery of the chill roll. Then, the solidified alloy ribbon will be heat-treated and imparted with permanent magnet properties. After the heat-treatment, the alloy preferably includes Fe, an Fe—B alloy and $R_2Fe_{14}B$ as constituent phases and a mean crystal grain size of the constituent phases is preferably 100 nm or less. Thereafter, the alloy ribbon is finely pulverized into a magnet powder with a mean particle size of 300 μm or less. And by compaction- or injection-molding the magnet powder, a permanent magnetic body can be produced in a desired shape.

Quenching Machine

Figure 3A:
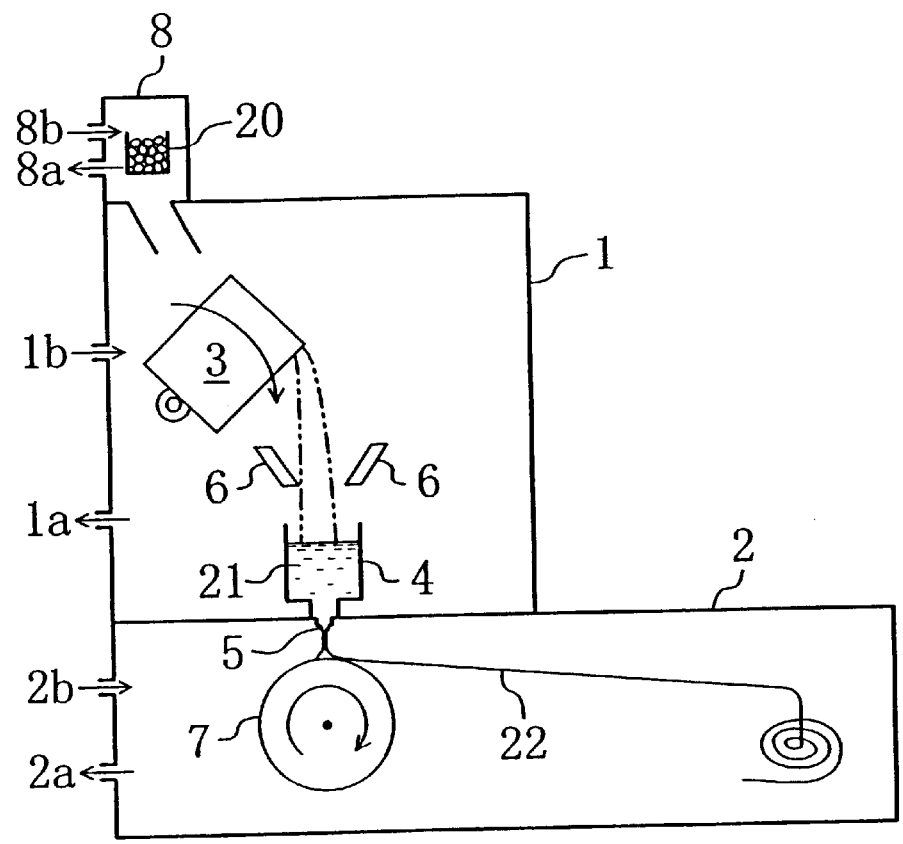
FIGS. 3A and 3B illustrate an exemplary construction for a melt-spinning machine (a single-roll machine) preferably used in the present invention.
Figure 3B:
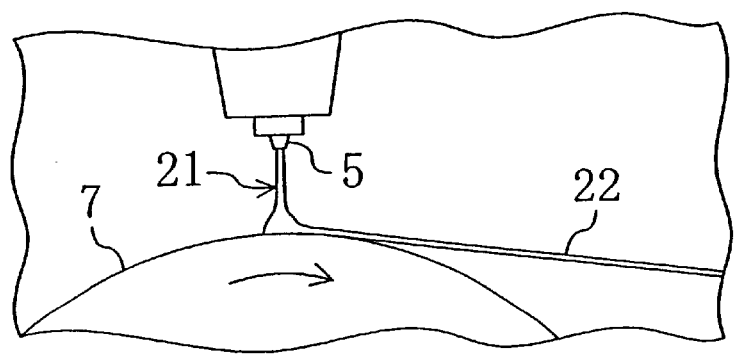

In this embodiment, a material alloy may be prepared using a melt-spinning machine such as that shown in FIGS. 3A and 3B. The alloy preparation process is performed within an inert gas ambient to prevent the material alloy, which contains an easily oxidizable rare earth element, from being oxidized. The inert gas is preferably a rare gas of helium or argon, for example. Nitrogen gas is not preferred, because nitrogen easily reacts with a rare earth element.

The machine shown in FIG. 3A includes material alloy melting and quenching chambers 1 and 2, in which vacuum or inert gas ambient is established at an adjustable pressure.

The melting chamber 1 includes a melting furnace 3, a melt crucible 4 with a teeming nozzle 5 at the bottom and an airtight compounded material feeder 8. A material alloy 20, which has been compounded to have a desired magnet alloy composition and supplied from the feeder 8, is melted in the melting furnace 3 at an elevated temperature. A melt 21 of the material alloy 20 is poured into the crucible 4, which is provided with a heater (not shown) for keeping the temperature of the melt teemed therefrom at a predetermined level.

The rapid quenching chamber 2 includes a rotating chill roll 7 for rapidly cooling and solidifying the melt 21 flows through the teeming nozzle 5.

In this machine, the ambient and the pressure inside the melting and rapid quenching chambers 1 and 2 are controllable within prescribed ranges. For that purpose, ambient gas inlet ports 1b, 2b and 8b and outlet ports 1a, 2a and 8a are provided at appropriate positions of the machine. In particular, the gas outlet port 2a is connected to a pump to control the absolute pressure inside the rapid quenching chamber 2 within the range from vacuum to 50 kPa.

The melting furnace 3 may be inclined at a desired angle to pour the melt 21 through a funnel 6 into the crucible 4. The melt 21 is heated in the crucible 4 by a heater (not shown).

The teeming nozzle 5 of the crucible 4 is positioned on the boundary wall between the melting chamber 1 and the rapid quenching chamber 2 to propel the melt 21 in the crucible 4 against the surface of the chill roll 7, which is located just under the nozzle 5. The orifice diameter of the nozzle 5 may be in the range from 0.5 to 2.0 mm, for example. If the viscosity of the melt 21 is high, then the melt 21 cannot flow through the nozzle 5 easily. In this embodiment, however, the pressure inside the rapid quenching chamber 2 is kept lower than the pressure inside the melting chamber 1. Accordingly, there exists an appropriate pressure difference between the melting and rapid quenching chambers 1 and 2, and the melt 21 can be teemed smoothly.

The chill roll 7 is preferably made of Cu, Fe or an alloy containing Cu or Fe. This is because if the chill roll 7 is made of a material other than Cu and Fe, then the solidified alloy cannot peel off the roll 7 smoothly and might be wound around, and adhered to, the roll 7. The diameter of the chill roll 7 may be in the range from 300 to 500 mm, for instance. The water-cooling capability of a water cooler provided inside the chill roll 7 is calculated and adjustable based on the latent heat of solidification and the volume of the melt teemed per unit time.

The machine shown in FIGS. 3A and 3B can solidify 20 kg of material alloy in 15 to 30 minutes, for example. The alloy solidified in this manner is in the form of a thin strip (or ribbon) 22 with a thickness of 80 to 300 μm and a width of 2 to 6 mm.

Quenching Process

First, the melt 21 of the material alloy, which is represented by the general formula described above, is prepared and stored in the crucible 4 of the melting chamber 1 shown in FIG. 3A. Next, the melt 21 is propelled through the teeming nozzle 5 against the chill roll 7 to come into contact with, and be rapidly cooled and solidified by, the chill roll 7 within a low-pressure Ar ambient. According to the present invention, the solidification rate should preferably be controllable with high precision.

It should be noted that the ambient inside the rapid quenching chamber 2 should have a reduced pressure. Preferably, the ambient is an inert gas with an absolute pressure of 50 kPa or less. This is because if the pressure of the ambient gas exceeds 50 kPa, then a considerable part of the ambient gas might be caught between the chill roll and the molten alloy and the resultant composition of the alloy might be non-uniform.

In this embodiment, by setting the surface velocity of the roll 7 to a range from 1 m/sec through 13 m/sec, the rapidly solidified alloy thin strip can have a thickness between 80 μm and 300 μm, both inclusive. If the surface velocity of the roll is less than 1 m/sec, then the mean crystal grain size will be too large. But if the surface velocity of the roll exceeds 13 m/sec, then the rapidly solidified alloy thin strip will have a thickness of less than 70 μm. In that case, a powder, which will be obtained by a pulverization process using a pin disk mill (to be described later), will have a minor/major-axis ratio of less than 0.3. As used herein, the "minor/major-axis ratio" is a ratio of the minor-axis size of a powder particle to the major-axis size thereof. If the minor/major-axis ratio is less than 0.3, then the resultant magnetic powder cannot be filled in successfully or will have a decreased flowability during a molding process. Accordingly, a volume fraction of the powder in the magnet is reduced.

Heat-Treatment for Crystallization

In this embodiment, after the rapid quenching process has been performed, the solidified alloy is heat-treated and crystallized, thereby creating nanometer-scaled crystals with a mean crystal grain size of 100 nm or less. The heat-treatment is preferably conducted at a temperature between 400° C. and 700° C., more preferably between 500° C. and 700° C., for 30 seconds or more. This is because if the heat-treatment temperature exceeds 700° C., then the particle size increases excessively to deteriorate the magnetic properties. But if the anneal temperature is lower than 400° C., then no $R_2Fe_{14}B$ phases will be deposited and a high coercivity cannot be attained.

By conducting the heat-treatment under these conditions, nanometer-scaled crystals of Fe, Fe—B alloy and a compound with an $R_2Fe_{14}B$ crystal structure can be grown to have a mean crystal grain size of 100 nm or less. A preferred heat-treatment time changes depending on the heat-treatment temperature. For example, where the anneal is carried out at 600° C., the anneal is preferably performed for about 30 seconds to about 30 minutes. This is because if the heat-treatment is performed for less than 30 seconds, the crystallization might sometimes be incomplete.

Before the heat-treatment is conducted, a rough pulverization process is preferably performed to make a powder with a mean particle size of about 100 to about 1,000 μm out of the alloy. As used herein, the "mean particle size" refers to a mass median size.

Pulverization Process

In this embodiment, the roughly pulverized powder obtained by the above method is further pulverized finely using the pin disk mill shown in FIGS. 1A and 1B. As a result, a powder with a mean particle size of 10 lm through 100 μm, for example, can be obtained. Also, the powder particles obtained have a minor/major-axis ratio of 0.3 through 1.0.

According to this embodiment, even if a heavy weight of powder is pulverized, the pins are not worn out easily. In general, if pins are worn out, then the particle size distribution of a pulverized powder changes. Particularly where the powder is a magnetic material for a magnet, for example, that size distribution changing might seriously affect the resultant magnetic properties. In contrast, according to this embodiment, the particle size distribution is much less likely to change with time, and therefore, a magnetic material product with excellent magnetic properties can be obtained in the end.

Method of Producing a Magnet

First, a binder of an epoxy resin and an additive are added to the magnet powder obtained in the above-described way and then kneaded together to form a compound. Next, the compound is subjected to compaction molding using a pressing machine with a cavity corresponding to a desired shape for the compound. Subsequently, the compacted compound is cured, cleaned, coated, tested and then magnetized to obtain a final bonded magnet product.

The molding process does not have to be the compaction molding process. Alternatively, the process may be performed by known extrusion molding, injection molding or roll molding. The magnet powder is kneaded with plastic, rubber or the like, which is selected depending on the type of the molding process adopted.

In employing injection molding, not only polyimide (nylon) widely used as a resin, but also a high-softening-point resin such as PPS may be used. This is because the magnet powder according to this embodiment is made from an alloy containing only a small fraction of rare earth elements, and therefore is not oxidizable easily. Accordingly, even when the magnet powder is molded by an injection process at a relatively high temperature, the magnetic properties thereof do not deteriorate.

EXAMPLES

In an example of the present invention, an $Fe_3B/Nd_2Fe_{14}B$ nanocomposite magnet alloy was pulverized using a pin disk mill that was equipped with multiple pins made of a sintered body of tungsten carbide (WC).

The pin disk mill used may have the construction shown in FIGS. 1A, 1B and 2. The diameter of the pins of WC may be 6 mm, and the disks supporting the pins thereon may be made of austenitic stainless steel (e.g., JIS SUS304). One of the two disks may be secured in a freely rotatable state to the machine and driven by a motor. The velocity of the disk is controllable between 1,000 and 20,000 revolutions per minute (RPM). The diameter of the rotating disk may be 190 mm. The other disk may be fixed to the machine and may also have a diameter of 190 mm.

On the rotating disk, about 110 pins may be arranged in three concentric circles. On the other hand, about 140 pins may be arranged in three concentric circles on the fixed disk.

In this example, the disk was revolved at 7,000 RPM to pulverize 1 kg of the alloy per minute.

Before the alloy was loaded into this mill, the alloy had been coarsely pulverized into flakes with a mean particle size of about 400 μm using a power mill. The power mill used in this example was a machine for pulverizing a workpiece by rotating a set of four vertically stacked blades inside a stainless mesh case of a size corresponding to a desired particle size. The four blades, on which WC had been sprayed, were stacked one upon the other with spacers interposed between them.

Figure 4:
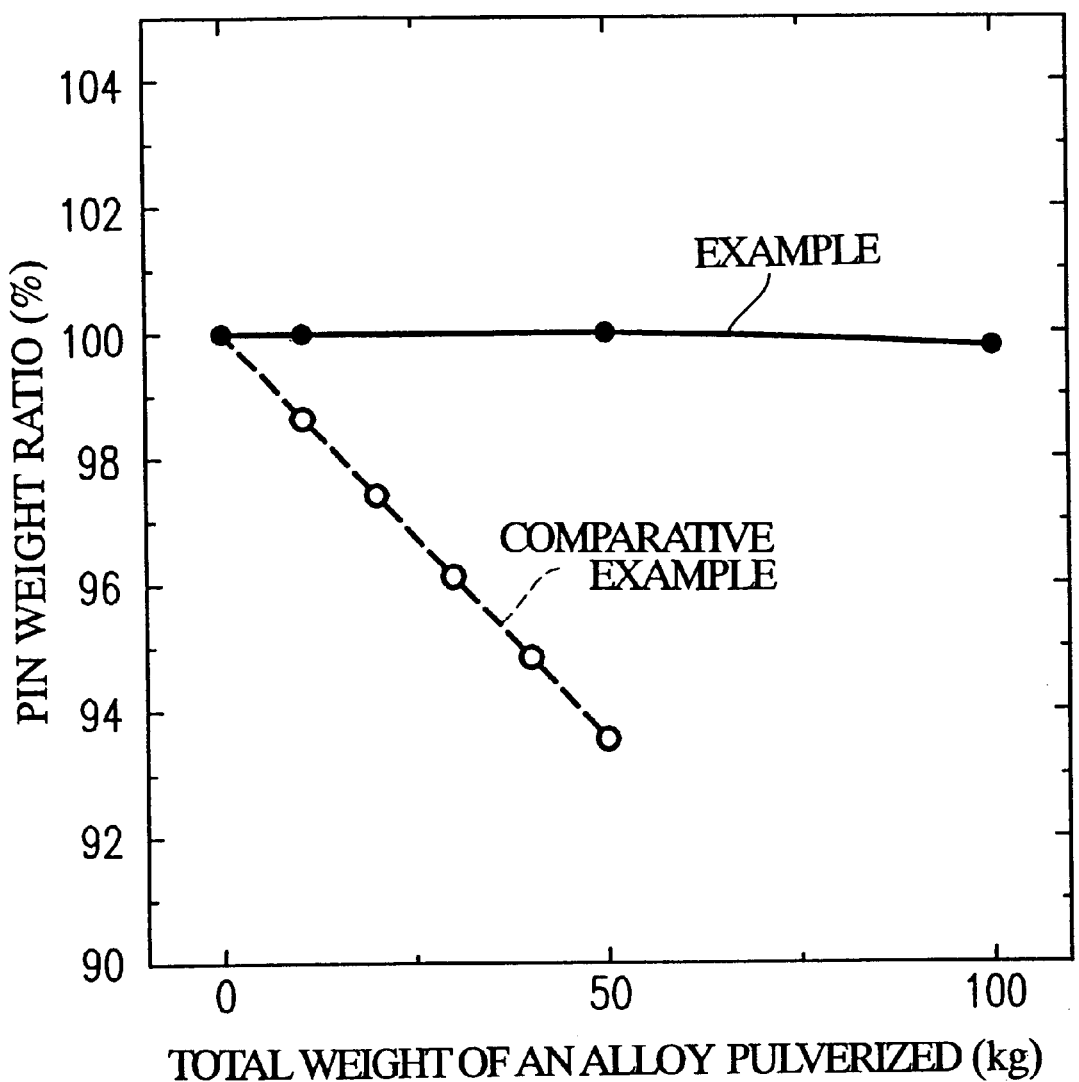
FIG. 4 is a graph plotting pin weight ratios, each representing a ratio of total pin weights before and after a pulverization process, against the total weight of an alloy pulverized.

FIG. 4 is a graph plotting pin weight ratios, each representing a ratio of total pin weights of the pin disk mill used before and after the pulverization process, against the total weight of the alloy pulverized. In FIG. 4, the solid circles, linked with the solid lines, represent the results obtained for the example of the present invention, while the open circles, linked with the broken lines, represent the results obtained for a comparative example. A pin disk mill used for the comparative example had totally the same construction as the mill of this example except that the pins of the comparative example were made of an austenitic stainless steel.

As can be seen from FIG. 4, almost no wear of the pins is observable in the example of the present invention until the total weight of the alloy pulverized reaches 100 kg. In contrast, in the comparative example, the total pin weight has already decreased by as much as 6% even when the total weight of the alloy pulverized reaches 50 kg. The stainless steel scraped off the pins mixes with the pulverized powder. The 6% decrease of the total pin weight means that about 0.15% by mass of stainless steel has mixed into the powder. It should be noted that the particle size distributions were measured after the pulverized powder had been screened.

Figure 5:
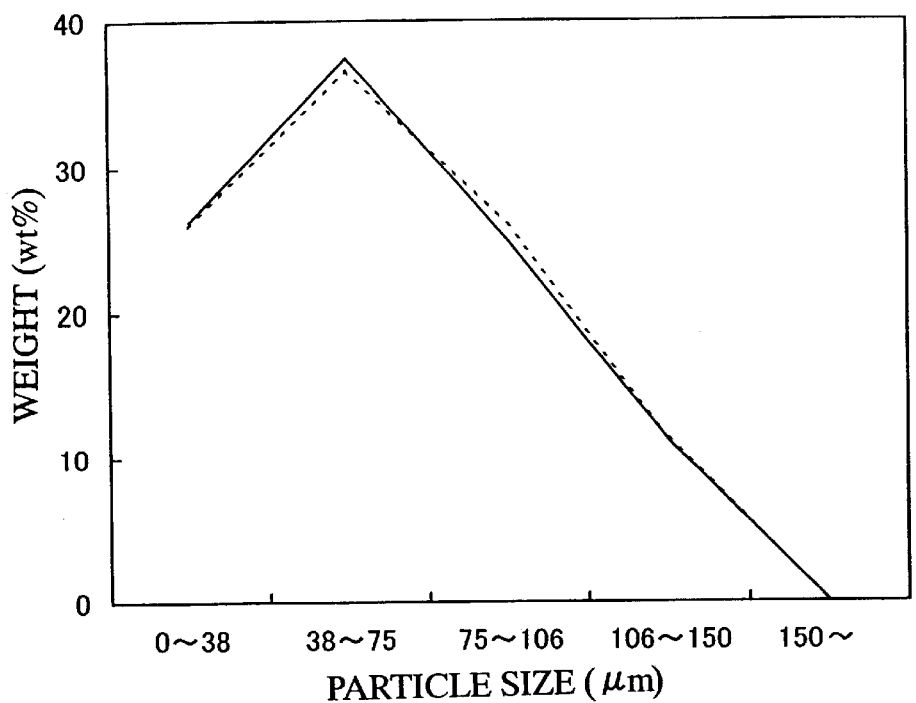
FIG. 5 is a graph illustrating particle size distributions at points in time 10 and 50 kg of alloy has been pulverized by the solid and broken lines, respectively, for an example of the present invention.

The following Table 1 and FIG. 5 show the particle size distributions at points in time 10 and 100 kg of the alloy was pulverized by the solid and broken lines, respectively, for the example of the present invention.

TABLE 1

| Particle size (μm) | After 10 kg of alloy pulverized (wt %) | After 100 kg of alloy pulverized (wt %) |
| --- | --- | --- |
| 0 to 38 | 26.31 | 25.99 |
| 38 to 75 | 37.5 | 36.65 |
| 75 to 106 | 25 | 26.07 |
| 106 to 150 | 11.17 | 11.27 |
| 150 or more | 0.02 | 0.02 |
| Total | 100 | 100 |

Figure 6:
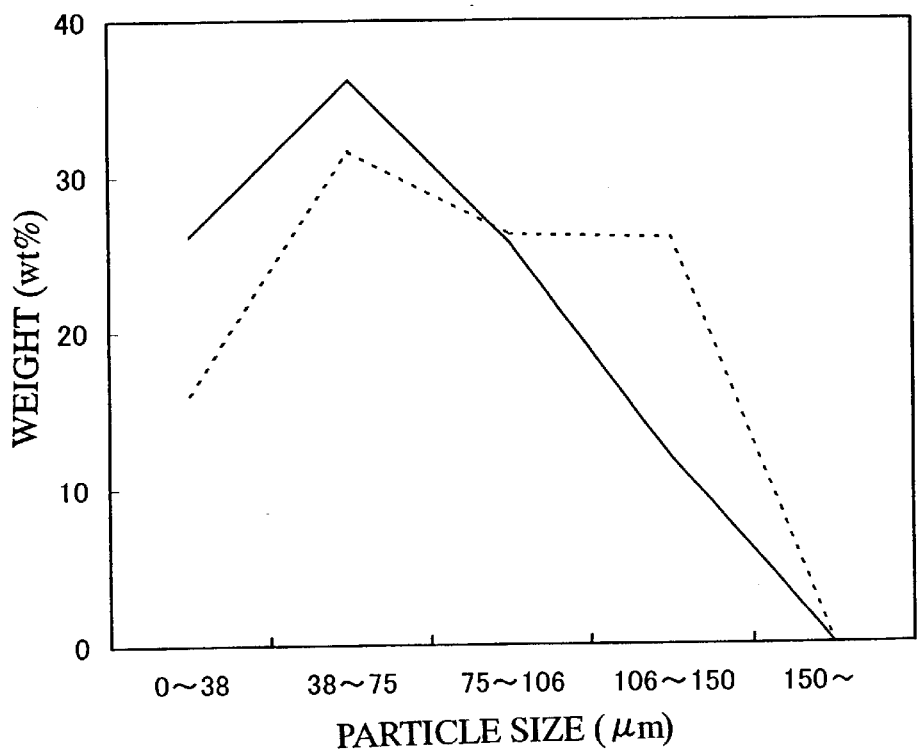
FIG. 6 is a graph illustrating particle size distributions at points in time 10 and 50 kg of alloy has been pulverized by the solid and broken lines, respectively, for a comparative example.

On the other hand, the following Table 2 and FIG. 6 show the particle size distributions at points in time 10 and 50 kg of the alloy was pulverized by the solid and broken lines, respectively, for the comparative example.

TABLE 2

| Particle size ($\mu$m) | After 10 kg of alloy Pulverized (wt %) | After 50 kg of alloy Pulverized (wt %) |
|---|---|---|
| 0 to 38 | 26.14 | 16.11 |
| 38 to 75 | 36.16 | 31.57 |
| 75 to 106 | 25.69 | 26.23 |
| 106 to 150 | 11.99 | 25.99 |
| 150 or more | 0.02 | 0.1 |
| Total | 100 | 100 |

Compared to the particle size distribution for 10 kg of the alloy pulverized, the distribution for 50 kg of the alloy pulverized has changed considerably and the mean particle size thereof has greatly increased in the comparative example. In contrast, according to this example, the particle size distribution is almost unchanged even when the total weight of the alloy pulverized reaches 100 kg, as can be easily seen from these results.

If the particle size distribution changes as in the comparative example, then the pins and other wearable parts should be replaced very often, because that distribution changing is not preferable for the production of magnets. However, such frequent exchange raises the personnel costs, thus increasing the overall manufacturing costs disadvantageously. In contrast, according to the present invention, the pins and other wearable parts need to be replaced only occasionally and that unwanted increase in manufacturing costs is avoidable. In addition, according to the present invention, a reduced percentage of the material for the pins and other wearable parts mixes into the powder. Accordingly, a powder with a higher purity can be obtained as well.

The foregoing embodiments and examples of the present invention relate to a method of pulverizing a nanocomposite magnet alloy that has been prepared by a quenching process. However, the present invention is not limited to such specific embodiments, but is broadly applicable to any other iron base magnetic material alloy containing at least 50% by mass of iron. Examples of the magnetic material alloys containing at least 50% by mass of iron include: soft magnetic materials such as Fe—Si—B—Nb—Cu and Fe—Zr—B alloys; Nd—Fe—Co—B magnet powder manufactured by MQI Corp.; anisotropic $Nd_2Fe_{14}B$ (HDDR) magnet powder; ferromagnetic materials such as $Sm_2Fe_{17}$ magnet powders; and $RFe_2$ giant-magnetostrictive materials.

Also, in the foregoing description, a crystallized iron base magnetic material alloy is pulverized using the disk mill. Alternatively, an iron base magnetic material alloy in an amorphous state or containing amorphous phases may be pulverized as well. Generally speaking, amorphous phases are harder to pulverize than crystalline phases. Thus, if an amorphous alloy is pulverized, the pins are worn out even more easily. Accordingly, the greater the percentage of amorphous phases contained in a workpiece, the more remarkable the effects of the present invention, so to speak.

According to the present invention, portions (e.g., pins) of a pin mill, which collide against a workpiece, are made of a cemented carbide material. Thus, even if a highly viscous iron base magnetic material alloy, containing as much as 50% by mass or more of iron, is pulverized by the pin mill, the pins are not worn out easily and a desired particle size distribution still can be obtained. Therefore, an iron base magnetic material alloy powder, prepared by the present invention, is effectively applicable to bonded magnets and other magnetic material products. Further more, a pin mill in which a plurality of pins are arranged on a cylindrical body can be employed.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

We claim:

1. A method of preparing an iron based nanocrystalline alloy powder for a nanocrystalline permanent magnet, comprising the steps of:

cooling a melt of an Fe—B—R alloy by a quenching process to obtain a solidified alloy having an $R_2Fe_{14}B$ crystalline phase wherein R is at least one rare earth element with a thickness of 80 $\mu$m through 300 $\mu$m;

annealing and crystallizing the rapidly solidified alloy to impart permanent magnet properties to the alloy, said annealed alloy comprising, as constituent phases, Fe, and Fe—B alloy, and a compound with an $R_2Fe_{14}B$ crystal structure, wherein the mean crystal grain size of the constituent phases is 100 nm or less; and pulverizing the alloy using a pin mill to obtain a powder of a mean particle size of 10 $\mu$m through 100 $\mu$m, wherein the portion of the pin mill that contacts the alloy comprises cemented carbide material, wherein the pulverizing step is conducted without causing substantial change between a first particle size distribution for 10 kg of the alloy pulverized and a second particle size distribution for 50 kg of the alloy pulverized.

2. The method according to claim 1, further comprising the step of coarsely pulverizing the solidified alloy prior to performing said heat-treating step.

3. The method according to claim 1 or 2, wherein prior to performing said heat-treating step, the solidified alloy has a structure comprising an amorphous phase; at least one metastable phase selected from the group consisting of $Fe_{23}B_6$, $Fe_3B$ and $R_2Fe_{23}B_3$ phases; and an $R_2Fe_{14}B$ phase.

4. The method according to claim 1 or 2, wherein prior to performing said annealing step, the solidified alloy further comprises an amorphous structure.

5. The method according to claim 1, wherein R is at least one rare earth element selected from the group consisting of Pr, Nd, Dy and Tb.

6. A method of producing a bonded magnet, comprising the steps of:

preparing an iron based nanocrystalline alloy powder for a nanocomposite permanent magnet by the method as recited in claim 1; and molding the iron based nanocrystalline alloy powder.

7. The method according to claim 1, wherein a particle size distribution of pulverized powder is substantially unchanged after 100 kg of the magnetic material alloy has been pulverized by the pin mill.

8. The method according to claim 1, wherein the cemented carbide material is tungsten carbide.

* * * * *